United States Patent
Berkcan et al.

(10) Patent No.: US 9,479,848 B2
(45) Date of Patent: Oct. 25, 2016

(54) SYSTEM AND METHOD FOR MONITORING CHARACTERISTICS OF AN ELECTRICAL DEVICE

(71) Applicant: General Electric Company, Schenectady, NY (US)

(72) Inventors: Ertugrul Berkcan, Clifton Park, NY (US); Yongjae Lee, Latham, NY (US); S M Shajedul Hasan, Rexford, NY (US); Steven William Wik, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 448 days.

(21) Appl. No.: 14/075,281

(22) Filed: Nov. 8, 2013

(65) Prior Publication Data

US 2015/0130480 A1    May 14, 2015

(51) Int. Cl.
| | |
|---|---|
| G01R 27/04 | (2006.01) |
| G01R 31/28 | (2006.01) |
| H04Q 9/00 | (2006.01) |
| H04B 5/00 | (2006.01) |

(52) U.S. Cl.
CPC ............... *H04Q 9/00* (2013.01); *H04B 5/0075* (2013.01)

(58) Field of Classification Search
CPC   G01R 31/315; G01R 31/343; G01R 31/021; G01R 31/027; G01R 31/2825; G01R 22/063; G01D 4/002; G06K 7/08; H04B 5/75; H04Q 9/00
See application file for complete search history.

(56) References Cited

U.S. PATENT DOCUMENTS

| | | | |
|---|---|---|---|
| 6,958,463 | B1 | 10/2005 | Kochman et al. |
| 7,683,798 | B2 | 3/2010 | Rostron |
| 7,808,400 | B2 | 10/2010 | McCollough |
| 8,169,311 | B1 | 5/2012 | Breed |
| 8,368,380 | B2 | 2/2013 | Berkcan et al. |
| 2009/0002164 | A1* | 1/2009 | Brillhart ............... H04W 48/02 340/572.1 |
| 2009/0303013 | A1 | 12/2009 | Edgerton |
| 2010/0156607 | A1 | 6/2010 | Lankes et al. |
| 2012/0054527 | A1 | 3/2012 | Pfeifer et al. |
| 2012/0293179 | A1 | 11/2012 | Colombo et al. |

OTHER PUBLICATIONS

Bhattacharya et al., "RFID tag antenna based temperature sensing using shape memory polymer actuation", Sensors, 2010 IEEE, 2010, pp. 2363-2368.

* cited by examiner

*Primary Examiner* — Minh N Tang
(74) *Attorney, Agent, or Firm* — Jason K. Klindtworth

(57) ABSTRACT

A remote monitoring system is presented. The system includes a sensor unit disposed in the electrical device, and configured to obtain measurement characteristics in response to a measurand of the electrical device, obtain reference characteristics insensitive to the measurand of the electrical device, and communicate the measurement characteristics and the reference characteristics using time varying electromagnetic fields. Further, the system includes a reader unit to establish a far-field communication with the sensor unit in the presence of at least one metallic interferer in the electrical device, wherein the reader unit is configured to receive the time varying electromagnetic fields associated with the measurement characteristics and the reference characteristics in response to a radio frequency signal transmitted to the sensor unit, and determine the measurand of the electrical device based on at least one property of the received time varying electromagnetic fields associated with the measurement characteristics and the reference characteristics.

12 Claims, 6 Drawing Sheets

SYSTEM AND METHOD FOR MONITORING CHARACTERISTICS OF AN ELECTRICAL DEVICE

BACKGROUND

Embodiments of the present disclosure relate generally to wireless sensing technology, and more particularly to a system and a method for monitoring characteristics of an electrical device using wireless sensing technology.

Sensing devices are used extensively to monitor characteristics of electrical distribution equipment, such as switch gears, panel boards, motor control centers etc. Typically, these sensing devices include high permeability material that is mounted on one or more current carrying conductors in the electrical distribution equipment. Since the current carrying conductors carry high current, a large magnetic field is generated around the current carrying conductors. This generated magnetic field may in turn affect or damage the high permeability material of the sensing devices.

Also, as the high permeability material of a sensing device is mounted on the current carrying conductors, operation of the electrical distribution equipment potentially may be affected or interfered by this high permeability material. In one example, the high permeability material of the sensing device may change the inductance, magnetic characteristics, or other properties of the current carrying conductors.

In addition, the sensing device is required to use near-field communication with a reader to minimize the interference from the high permeability material. In the near-field communication, a low frequency RF signal is used for monitoring the electrical distribution equipment. Since the low frequency RF signal is used, the sensing device may have to be placed proximate to a reader, which in turn prevents remote monitoring of the characteristics of the electrical distribution equipment.

Thus, there is need for an improved method and system to monitor the characteristics of the electrical distribution equipment or electrical device.

BRIEF DESCRIPTION

In accordance with one embodiment described herein, a remote monitoring system is presented. The remote monitoring system includes a sensor unit disposed in the electrical device, and configured to obtain measurement characteristics in response to a measurand of the electrical device, obtain reference characteristics insensitive to the measurand of the electrical device, and communicate the measurement characteristics and the reference characteristics using time varying electromagnetic fields. Further, the remote monitoring system includes a reader unit to establish a far-field communication with the sensor unit in the presence of at least one metallic interferer in the electrical device, wherein the reader unit is configured to receive the time varying electromagnetic fields associated with the measurement characteristics and the reference characteristics in response to at least one radio frequency (RF) signal transmitted to the sensor unit, and determine the measurand of the electrical device based on at least one property of the received time varying electromagnetic fields associated with the measurement characteristics and the reference characteristics.

In accordance with a further aspect of the present disclosure, a sensor device is presented. The sensor device includes a sensing sub-unit configured to obtain at least one of measurement characteristics in response to a measurand of an electrical device at one or more sensing positions, and reference characteristics insensitive to the measurand of the electrical device. Further, the sensor device includes a matching element coupled to the sensing sub-unit and configured to vary characteristics of the matching element corresponding to one of the measurement characteristics and the reference characteristics. In addition, the sensor device includes an electromagnetic field responsive element coupled to the matching element and configured to communicate one of the measurement characteristics and the reference characteristics using time varying electromagnetic fields corresponding to the characteristics of the matching element.

In accordance with another aspect of the present disclosure, a reader device is presented. The reader device includes an antenna to establish far-field communication with a sensor device disposed in an electrical device, and configured to receive time varying electromagnetic fields associated with measurement characteristics and the reference characteristics in response to a radio frequency (RF) signal transmitted to the sensor device. Further, the reader device includes a reader-processor coupled to the antenna and configured to determine a measurand of the electrical device based on at least one property of the received time varying electromagnetic fields associated with the measurement characteristics and the reference characteristics.

In accordance with yet another aspect of the present disclosure, a method for monitoring an electrical device is presented. The method includes obtaining, by a sensor unit, measurement characteristics in response to a measurand of the electrical device. Further, the method includes obtaining, by the sensor unit, reference characteristics insensitive to the measurand of the electrical device. In addition, the method includes communicating, by the sensor unit, the measurement characteristics and the reference characteristics using time varying electromagnetic fields to a reader unit. Also, the method includes receiving, by the reader unit, the time varying electromagnetic fields associated with the measurement characteristics and the reference characteristics in response to a radio frequency (RF) signal transmitted to the sensor unit. Furthermore, the method includes determining, by the reader unit, the measurand of the electrical device based on at least one property of the received time varying electromagnetic fields associated with the measurement characteristics and the reference characteristics.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary structures and methods for monitoring characteristics of an electrical device are presented. By employing the methods and the various embodiments of the system described hereinafter, the characteristics of the electrical device may be monitored even in the presence of one or more metallic interferers in the electrical device. Also, these characteristics may be remotely monitored by using a far-field communication in the electrical device.

Figure 1:
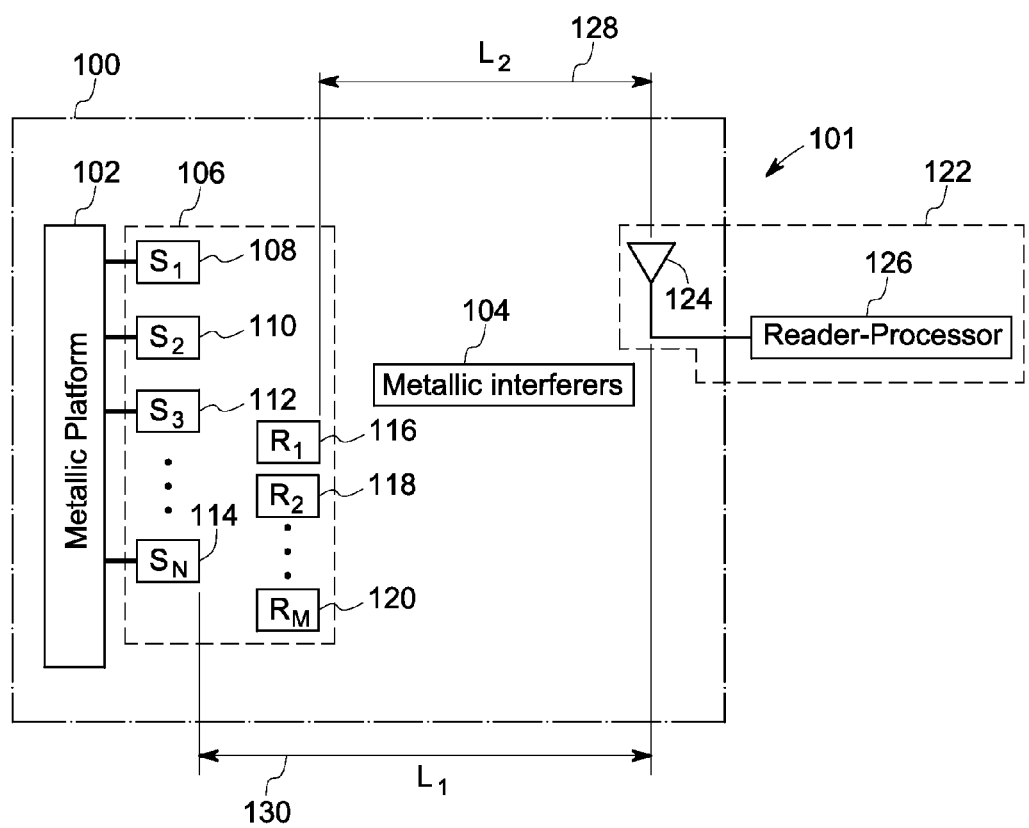
FIG. 1 is a block diagram of an electrical device having a remote monitoring system, in accordance with aspects of the present disclosure.

Turning now to the drawings, and referring to FIG. 1, an electrical device 100 having a remote monitoring system 101, in accordance with aspects of the present disclosure, is depicted. The electrical device 100 may be any current carrying device, such as switch gear, panel boards, motor control centers, transformers, electrical distribution equipment, and power distribution equipment, for example. In the embodiment of FIG. 1, the electrical device 100 may include a metallic platform 102 and one or more metallic interferers 104. In one example, the one or more metallic interferers may include, but not limited to neighborhood switch gears, panels, cabinet walls, and electrical wires.

As will be appreciated, the metallic platform 102 may include one or more high current carrying conductors and components such as, high current joints, circuit breakers, and lugs. In one example, the current carrying conductors may carry a current in a range from about 10 milliamps to about 10000 amps. Since high current flows through the metallic platform 102, the components, such as joints, lugs, and circuit breakers in the electrical device 100 are susceptible to wear or damage. Thus, it is generally desirable to monitor characteristics or measurands of the electrical device 100 so as to maintain operational health of the electrical device 100.

In a conventional electrical device, sensing devices having a high permeability layer are mounted on the current carrying conductors to sense the characteristics of the electrical device. However, when high current flows through these conductors, a large magnetic field may be generated around the conductors, which in turn affects or damages the high permeability layer of the sensing devices. Also, these sensing devices are required to use near-field communication to minimize interference from the high permeability material. Since the near-field communication includes a low frequency RF signal, the sensing device may have to be placed proximate to a reader for the reader to receive sensing signals. Particularly, the reader is positioned within the electrical device or proximate to the electrical device to receive the sensing signals, which in turn prevents remote monitoring of the characteristics of the electrical device.

To address these problems, a remote monitoring system 101 is employed to determine one or more measurands of the electrical device 100. In a non-limiting example, the measurands may represent temperature in the electrical device, thermal joint conditions, hot spot detection, electrical device condition, bad joints and connections, joint oxidation and distortion, increased joint resistance, junction impedance, resistance and reactance, $I^2t$ problems, loose lugs, loose joints, bad bearings, circulating currents, worn circuit breaker contacts, or combinations thereof.

In a presently contemplated configuration, the remote monitoring system 101 includes a sensor unit 106 and a reader unit 122. The sensor unit 106 may be positioned in the electrical device 100, while the reader unit 122 may be positioned at a first distance 130 from the sensor unit 106. The first distance 130 may be in a range from about 10 cm to about 300 cm. As depicted in FIG. 1, the sensor unit 106 includes one or more sensor tags 108, 110, 112, 114 that are disposed at a sensing position on the metallic platform 102. The sensor tags 108-114 are configured to obtain measurement characteristics in response to the measurands of the electrical device 100. The measurement characteristics may be obtained based on changes in one or more parameters of the sensor tags 108-114. In one example, the one or more parameters may include impedance, dielectric constant, resistance, capacitance, inductance, and/or geometrical parameters of a respective sensor tag. Further, the sensor tags 108-114 may send the obtained measurement characteristics to the reader unit 122 through time varying electromagnetic fields. The aspect of obtaining the measurement characteristics and sending the measurement characteristics to the reader unit 122 will be explained in greater detail with reference to FIG. 2.

In addition, the sensor unit 106 includes one or more reference tags 116, 118, 120 that are disposed at a second distance 128 from the reader unit 122. The second distance 128 may be in a range from about 10 cm to about 125 cm. In one embodiment, the second distance 128 may be lesser than the first distance 130. Further, the reference tags 116-120 are configured to obtain reference characteristics that are insensitive to the measurands of the electrical device 100. The reference characteristics may be obtained based on changes in one or more parameters of the reference tags 116-120. In one example, the one or more parameters may include impedance, impedance change, a geometrical parameter, a coupling parameter, and/or a dielectric constant of a respective reference tag. In another example, the one or more parameters may include gain, resonant frequency, and/or resonant frequency shift of a radio frequency (RF) signal sent to the reference tags 116-120.

In one embodiment, the reference characteristics may indicate an error source in the electrical device 100. The error source may include power level shifts, reader power shifts, ambient temperature, ambient moisture, and changes to conditions external to the operation of the electrical device. Further, the reference tags 116-120 may send the obtained reference characteristics to the reader unit 122 through time varying electromagnetic fields. The aspect of obtaining the reference characteristics and sending the reference characteristics to the reader unit 122 will be explained in greater detail with reference to FIG. 2.

Furthermore, the reader unit 122 may be configured to establish a far-field communication with the sensor unit 106. The far-field communication may be referred to as communication between the reader unit 122 and the sensor unit 106 in a region that is more than two wavelengths from a reader antenna. This region may also extend outwards from the reader antenna. Also, in far field communication, RF power level attenuates to inverse square law of the distance between the reader antenna and the sensor unit 106.

Particularly, the far-field communication with the sensor unit 106 may be established even in the presence of the one or more metallic interferers 104 in the electrical device 100. In one embodiment, the reader unit 122 may be positioned at a remote location from the electrical device 100, and the reader unit 122 may establish the far-field communication with the sensor unit 106 to remotely monitor characteristics of the electrical device 100. In another embodiment, the reader unit 122 may be disposed within the electrical device 100.

As depicted in FIG. 1, the reader unit 122 may include an antenna 124 and a reader-processor 126 that are coupled to each other. The antenna 124 may send one or more radio frequency (RF) signals to the sensor unit 106, and in response, the antenna 124 may receive the time varying electromagnetic fields associated with the measurement characteristics and the reference characteristics. Further, the received time varying electromagnetic fields associated with the measurement characteristics and the reference characteristics are sent to the reader-processor 126. Thereafter, the reader-processor 126 may determine the measurands of the electrical device 100 based on one or more properties of the received time varying electromagnetic fields. Particularly, the reader-processor 126 may determine signal characteristics, such as RSSI, magnitude, phase, and/or frequency shift of the received time varying electromagnetic fields. Further, the reader processor may employ a look-up table that includes the signal characteristics and their corresponding measurands. More specifically, the reader-processor 126 may use the look-up table to identify the measurands that are mapped with the determined signal characteristics of the received time varying electromagnetic fields. In one example, the lookup table may be predetermined through calibration or through the use of known material properties. In one embodiment, the reader-processor 126 may use a transfer function that is generated based on calibration, experimentation, and/or material properties to determine the measurands of the electrical device 100.

Furthermore, the properties of the time varying electromagnetic fields include return signal strength, resonant frequency, resonant frequency shift, polarization, reflection coefficient, backscatter ratio, radar cross section, absorption, or combinations thereof, of the RF signal sent to the sensor unit 106. In one embodiment, the reader-processor 126 may determine the measurand of the electrical device even when one or more error sources are present in the electrical device. The aspect of determining the measurands of the electrical device 100 will be explained in greater detail with reference to FIG. 2. Thus, by employing the exemplary remote monitoring system 101, the characteristics or measurand of the electrical device 100 may be remotely monitored. Also, these characteristics or measurands of the electrical device 100 may be monitored even when one or more metallic interferers 104 are present in the electrical device 100.

Figure 2:
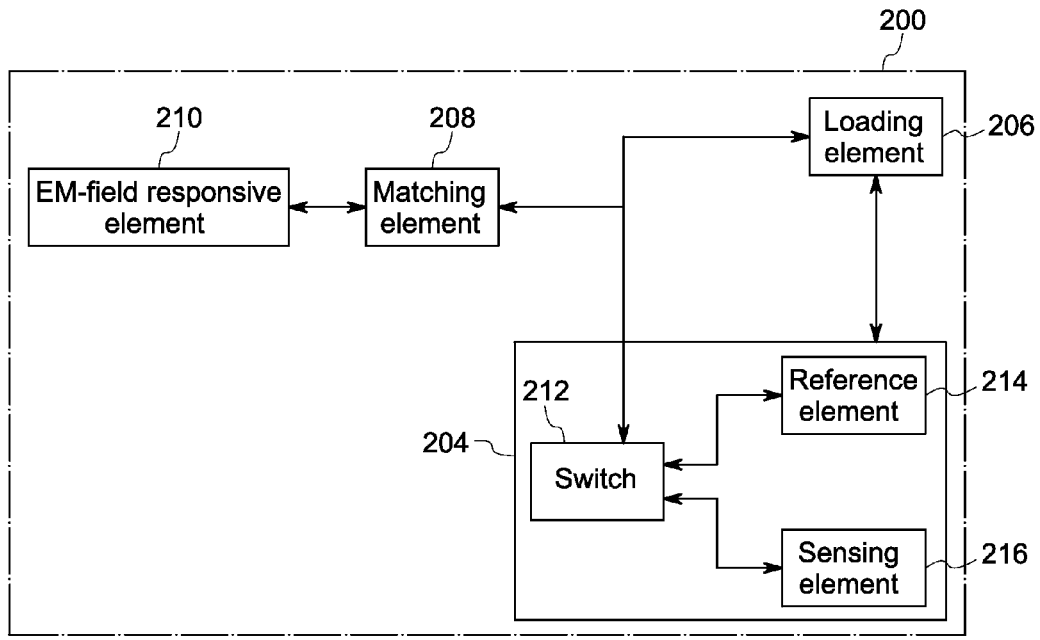
FIG. 2 is a block diagram of a sensor device, in accordance with one embodiment of the present disclosure.
Figure 3:
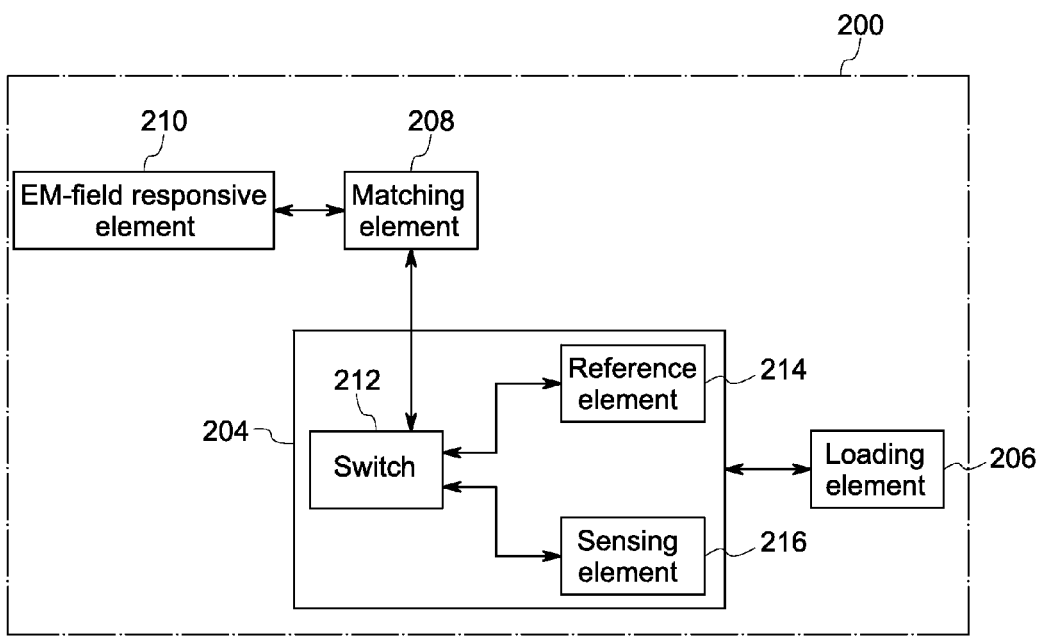
FIG. 3 is an illustration of a sensor device, in accordance with another embodiment of the present disclosure.

Referring to FIG. 2, a block diagram of a sensor device, in accordance with aspects of the present disclosure, is depicted. For ease of understanding of the present disclosure, the sensor device 200 is described with reference to the components of FIG. 1. The sensor device 200 is a representation of one of the sensor tags 108-114 or one of the reference tags 116-120 in FIG. 1. Particularly, the sensor device 200 includes a sensing sub-unit 204 that is used to determine the measurement characteristics when one type of RF signal is received from a reader 122. In one example, the sensing sub-unit 204 may determine the measurement characteristics when one or more RF signals that are in a frequency range from about 800 MHz to about 950 MHz are received from the reader 122. Alternatively, the sensing sub-unit 204 may be used to determine the reference characteristics when another type of RF signal is received from the reader 122. In one example, the sensing sub-unit 204 may determine the reference characteristics when one or more RF signals that are in a frequency range from about 800 MHz to about 950 MHz are received from the reader 122. More specifically, the sensing sub-unit 204 includes a switch 212, a reference element 214, and a sensing element 216. The switch 212 toggles between the sensing element 216 and the reference element 214 based on the type of RF signal received from the reader 122. The aspect of toggling between the elements 214, 216 and the aspect of determining the measurement characteristics and the reference characteristics are explained in greater detail with reference to FIG. 6. The sensor device 200 further includes a loading element 206, a matching element 208, and an electromagnetic (EM) field responsive element 210. The loading element 206 may be configured to determine a load that is acting on the sensor device 200. The loading element 206 and the sensing sub-unit 204 may have a parallel electrical connection with the matching element 208, which is further coupled to the EM-responsive element 210. In an alternative embodiment, the loading element 206 and the sensing sub-unit 204 may be coupled in series, which may be further coupled to the matching element 208, as depicted in FIG. 3. In various embodiments, the loading element 206 may include a modulating block, a plurality of impedances, a switch, and/or an RFID chip, for example.

Moving back to FIG. 2, the sensing sub-unit 204 includes the sensing element 216 that is configured to obtain measurement characteristics in response to one or more measurands of the electrical device 100. Particularly, one or more parameters of the sensing element 216 may change corresponding to the measurands of the electrical device 100. In one example, the parameters such as impedance, dielectric constant, resistance, capacitance, inductance, and/or geometrical parameters of the sensing element may change due to the measurands of the electrical device 100. In one embodiment, the sensing element 216 may include a resistor, a capacitor, an inductor, memristor, MEMs units, mechanical units, electro-mechanical units, and/or a unit with two different co-efficients of expansion.

As mentioned above, the sensor device 200 may also be used as one of the reference tags 116-120 in FIG. 1. Particularly, the sensing sub-unit 204 may include the reference element 214 that is configured to obtain reference characteristics which are insensitive to the measurand of the electrical device 100. The reference characteristics may represent one or more parameters of the reference element 214 that are changed due to certain conditions other than the measurands of the electrical device 100. For example, the impedance of the reference element 214 may be changed due to interference signals from the metallic interferers. The one or more parameters of the reference element 214 may include impedance, impedance change, a geometrical parameter, a coupling parameter, and/or a dielectric constant of the reference element 214. In one embodiment, the reference characteristics may indicate error sources, such as power level shifts, reader power shifts, ambient temperature, ambient moisture, and/or changes to conditions external to the operation of the electrical device 100.

Further, the matching element 208 coupled to the sensing sub-unit 204 may be configured to vary characteristics of the matching element 208 corresponding to the measurement characteristics or the reference characteristics. In one example, if the switch 212 in the sensing sub-unit 204 is coupled between the matching element 208 and the sensing element 216, the characteristics of the matching element 208 may vary corresponding to the measurement characteristics of the sensing element 216. In another example, if the switch 212 in the sensing sub-unit 204 is coupled between the matching element 208 and the reference element 214, the characteristics of the matching element 208 may vary corresponding to the reference characteristics of the reference element 214. Also, the matching element 208 may include an inductive coil that is coupled to the sensing sub-unit 204. Further, inductance across the coil may vary corresponding to the measurement characteristics or the reference characteristics. In one embodiment, the matching element 208 may include a T-match, an inductively coupled loop, a nested slot, a resistor, a capacitor, an inductor, and combinations thereof.

Furthermore, the EM-field responsive element 210 coupled to the matching element 208 is configured to communicate the measurement characteristics or the reference characteristics using time varying electromagnetic fields corresponding to the characteristics of the matching element 208. The EM-field responsive element 210 may include a conducting back plane that is used for RF ground plane. In one embodiment, the conducting back plane may be coupled to a metallic plate in the electrical device where the measurands are measured. In one example, the electromagnetic field responsive element 210 includes a rectangular micro-strip antenna, a patch antenna, a monopole antenna, planar inverted-F antenna, quarter-wavelength patch, and/or a spiral antenna.

In one embodiment, the EM-field responsive element 210 may be configured to radiate RF signals in close proximity to a metallic platform 102. Particularly, the EM-field responsive element 210 may include an antenna (not shown in FIG. 2) that is configured to reflect RF signals corresponding to the characteristics of the matching element 208. In one example, if the sensing sub-unit 204 does not obtain the measurement characteristics or the reference characteristics, the inductance of the matching element 208 may be unchanged from its initial inductance. Thus, the impedance of the EM-field responsive element 210 may continue to match with the impedance of the matching element 208. Hence, the EM-field responsive element 210 will have zero reflection coefficient and the RF signals may not be reflected back to the reader unit 122. However, if the inductance of the matching element 208 is varied corresponding to the measurement characteristics or the reference characteristics, the impedance of the matching element 208 may mismatch with the impedance of the EM-field responsive element 210. This in turn causes the RF signals to modulate or reflect back to the reader unit 122. In one embodiment, the modulated RF signals indicate the measurement characteristics or the reference characteristics. Also, these modulated RF signals may be sent to the reader unit 122 using time varying electromagnetic fields.

Figure 4:
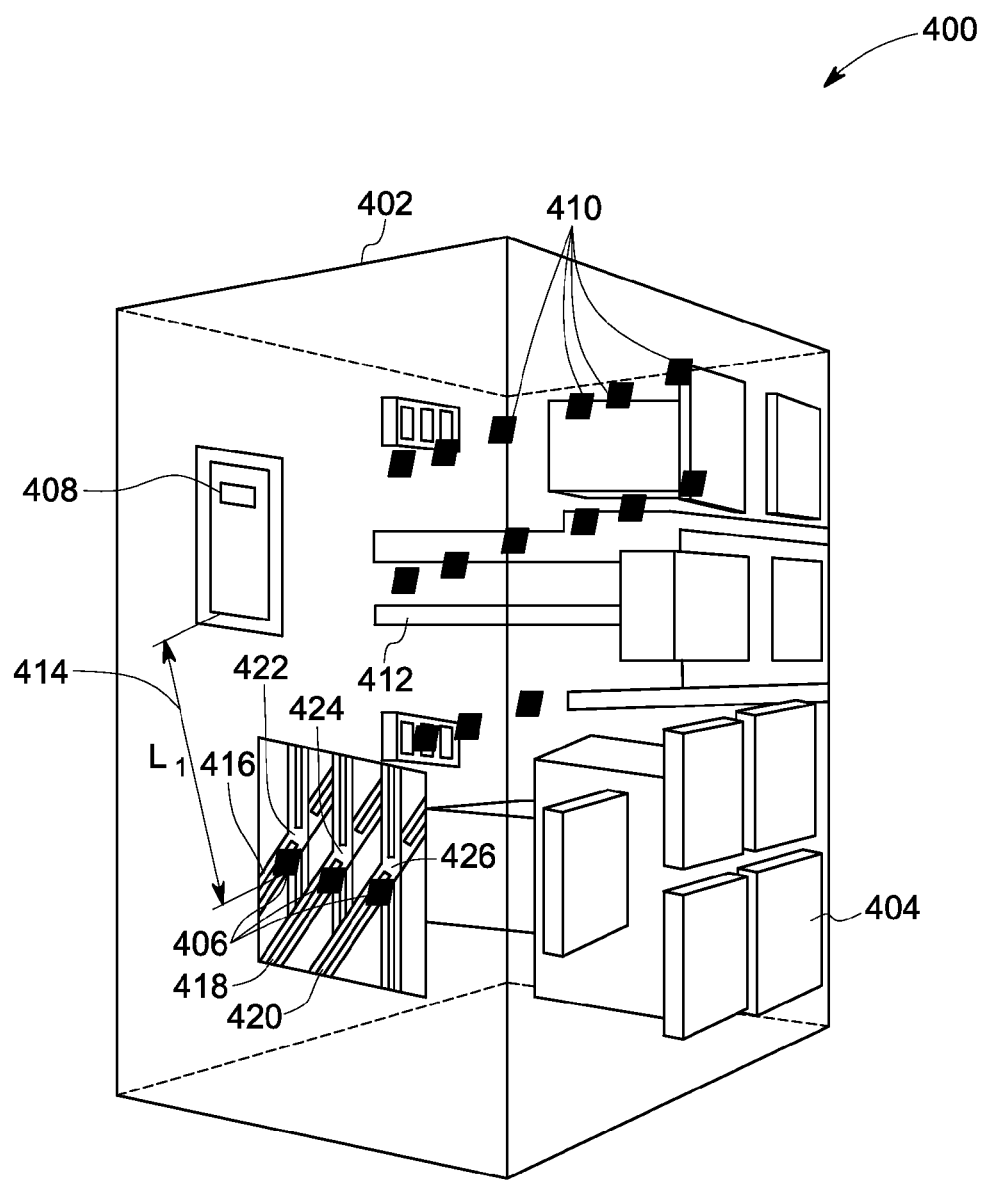
FIG. 4 illustrates an electrical device structure having the remote monitoring system, in accordance with aspects of the present disclosure.

Referring to FIG. 4, a structure of an electrical device having a remote monitoring system, in accordance with aspects of the present disclosure, is depicted. The electrical device 400 may be representation of the electrical device 100 in FIG. 1. The electrical device 400 may include a metallic platform 404, one or more metallic interferers 412, and other components, such as circuit breakers, lugs etc., which are enclosed in a housing 402. The metallic platform 404 may include one or more high current carrying conductors 416, 418, 420 that pass through hot joints 422, 424, 426, as depicted in FIG. 4. In one example, the hot joints 422, 424, 426 may be referred to as an intersection of current carrying conductors. Further, sensor tags 406 of a remote monitoring system are coupled to the current carrying conductors 416, 418, 420 at these hot joints 422, 424, 426 to obtain measurement characteristics that correspond to one or more measurands of the electrical device 400. The sensor tags 406 may be a representation of the sensor tags 108-112 in FIG. 1. It may be noted that the electrical device 400 may include other sensing points 410 where the sensor tags 406 may be disposed to sense the measurands of the electrical device 400.

In addition, a reader unit may be coupled to the housing 402 of the electrical device 400. Particularly, the reader unit includes an antenna 408 and a reader-processor (not shown in FIG. 4). The antenna 408 may be disposed on the housing 402 of the electrical device 400, while the reader-processor may be remotely positioned and communicatively coupled to the antenna 408 to remotely monitor characteristics of the electrical device 400. Further, the antenna 408 may be disposed at a first distance 414 from the sensor tags 406. The first distance 414 may be in a range from about 10 cm to about 300 cm. The antenna 408 may be configured to send RF signals to the sensor tags 406 and in response, may receive the time varying electromagnetic fields that represent the measurement characteristics of the sensor tags 406. Further, the antenna 408 may send these time varying electromagnetic fields to the reader-processor.

Figure 5:
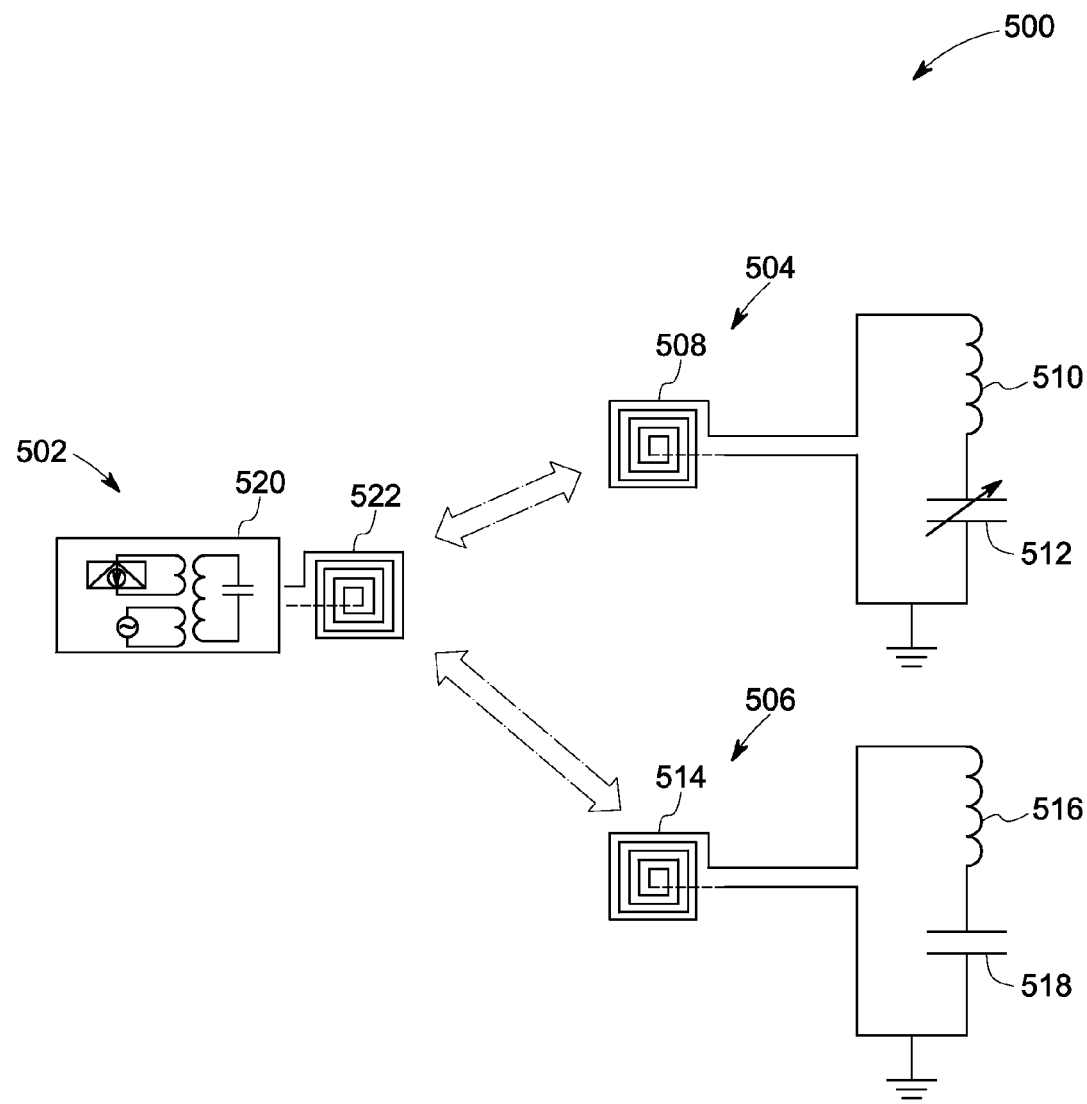
FIG. 5 is a schematic diagram of a remote monitoring system, in accordance with one embodiment of the present disclosure.

Referring to FIG. 5, a schematic diagram of a remote monitoring system 500, in accordance with aspects of the present disclosure, is depicted. The remote monitoring system 500 includes a reader unit 502 that is communicatively coupled to a sensor tag 504 and a reference tag 506. The reader unit 502 may be a representation of the reader unit 122 in FIG. 1. Also, the sensor tag 504 may be representation of one of the sensor tags 108-114 of FIG. 1. Similarly, the reference tag 506 may be representation of one of the reference tags 116-120 of FIG. 1.

In a presently contemplated configuration, the sensor tag 502 includes an antenna 508, a matching element 510, and a sensing element 512. The sensing element 512 may be used to obtain measurement characteristics that correspond to one or more measurands of the electrical device 100. In one example, capacitance of the sensing element 512 may be varied corresponding to the measurands of the electrical device 100. This in turn may change an impedance of the matching element 510. For example, an inductance of the matching element 510 may be changed corresponding to the varied capacitance of the sensing element 512. Further, the antenna 508 that is coupled to the matching element 510 may have a reflection coefficient corresponding to the change in the impedance of the matching element 510, which is further used for modulating or reflecting RF signals to indicate the measurands of the electrical device 100.

In a similar manner, the reference tag 506 includes an antenna 514, a matching element 516, and a reference element 518. The antenna 514 and the matching element 516 are similar to the antenna 508 and the matching element 510 of the sensor tag 504. The reference element 518 may be used to obtain reference characteristics that are insensitive to the measurands of the electrical device 100. In one example, the reference element 518 includes a capacitor that indicates signal strength of the RF signal received from the reader unit 122. This capacitor may be insensitive to the measurands of the electrical device 100. Particularly, the capacitor in the reference element 518 may include a dielectric material that is invariant to the variation of the measurands. In one embodiment, the reference characteristics indicate the one or more error sources in the electrical device 100.

Operationally, the reader unit 502 may send a first RF signal to the sensor tag 504. This first RF signal may be modulated by the sensor tag 504 corresponding to the measurement characteristics. Further, the modulated first RF signal is transmitted from the sensor tag 504 to the reader unit 502. However, while transmitting the modulated first RF signal to the reader unit 502, the modulated first RF signal may be distorted by one or more metallic interferers 104 in the electrical device 100. Also, the modulated first RF signal may include noise due to one or more interference signals in the electrical device 100. In one example, signal strength of the modulated first RF signal may be degraded by the interference signals. Thus, it may be difficult for the reader unit 502 to determine the measurement characteristics of the sensor tag 504 based on the received modulated first RF signal.

To avoid the above problems in the exemplary embodiment, the reference tag 506 is used to determine noise or distortion in the received first RF signal. Particularly, the reader unit 502 may send a second RF signal to the reference tag 506, and in response the reader unit 502 may receive a modulated second RF signal corresponding to the reference characteristics of the reference tag 506. It may be noted that the second RF signal may be the same as or different from the first RF signal. Since the reference characteristics are insensitive to the measurand of the electrical device, the modulated second RF signal may represent the one or more error sources in the electrical device 100. In one example, if an error source, such as a metal panel is placed in the vicinity of the sensor tag 504 and the reference tag 506, the received RF signals may be modulated differently than in the environment where there is no metal panel. An estimate of how the metal panel modulates the RF signals differently may be obtained from the reference tag 506. Thus, the reader unit 502 may use this modulated second RF signal to eliminate the noise or distortion in the modulated first RF signal. Thereafter, the reader unit 502 may determine the measurands of the electrical signal based on one or more properties of the received modulated first RF signal. In one embodiment, the reader unit 502 may use a look-up table to identify the measurands that are associated with the one or more properties of the received modulated first RF signal. In one example, the one or more properties of the received modulated first RF signal include return signal strength, resonant frequency, resonant frequency shift, polarization, reflection coefficient, backscatter ratio, radar cross section, absorption, or combinations thereof. In another example, the one or more properties of the received modulated RF signal include delay, phase shift, timing, time characteristics, and combinations thereof, of the modulated first RF signal. Thus, the reader unit 502 may determine the measurands in the electrical device 100 irrespective of whether the one or more error sources are present in the electrical device 100.

Figure 6:
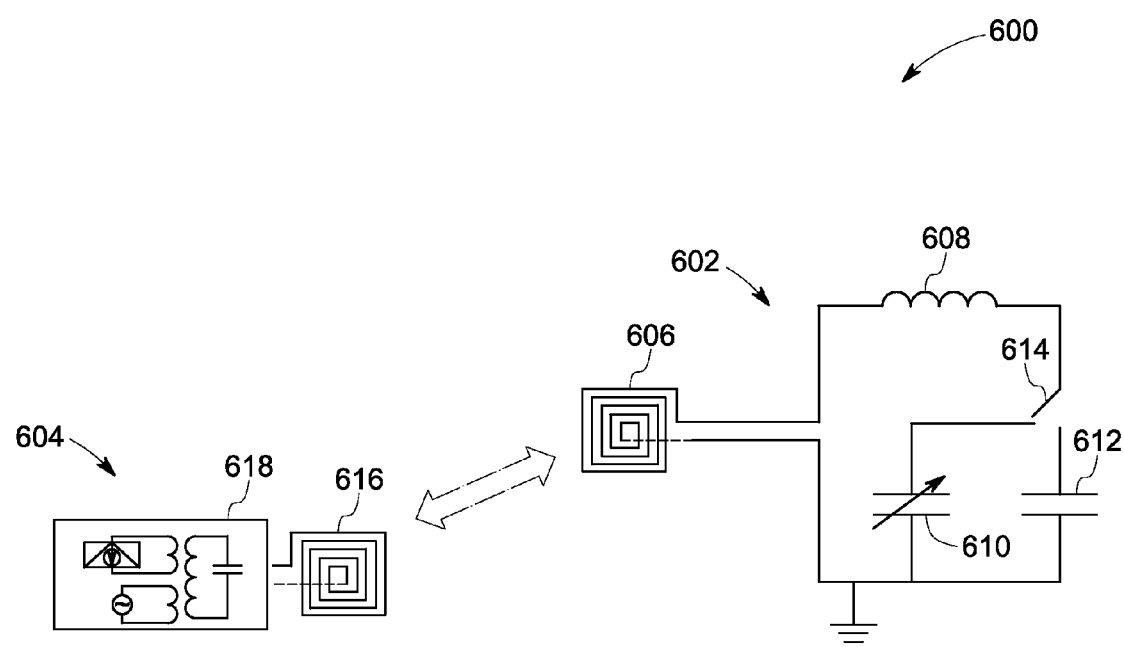
FIG. 6 is a schematic diagram of a remote monitoring system, in accordance with another embodiment of the present disclosure.

Referring to FIG. 6, a schematic diagram of a remote monitoring system, in accordance with one embodiment of the present disclosure, is depicted. The remote monitoring system 600 may be similar to the remote monitoring system 500 of FIG. 5 except that the sensor tag and the reference tag are included in a single circuit. Particularly, the sensing element 610 and the reference element 612 are coupled to the matching element 608 by a control switch 614. The control switch 614 toggles between the sensing element 610 and the reference element 612 based on the RF signal received from the reader unit 604. For example, if a first RF signal is received from the reader unit 604, the control switch 614 couples the sensing element 610 to the matching element 608. In a similar manner, if a second RF signal is received from the reader unit 604, the control switch 614 couples the reference element 612 to the matching element 608.

Also, in one embodiment, the control switch 614 couples the matching element 608 to the sensing element 610 or the reference element 612 when a pre-authorized signal is received from the reader unit 604. In one example, the pre-authorized signal may include a security code that is authenticated by a user or a manufacturer of the electrical device 100. Since the pre-authorized signal is required for operating the control switch 614, unauthorized readers or monitoring system may be prevented from receiving the measurands of the electrical device. This in turn aids in using only the authorized readers or monitoring systems, which further improves revenue for the manufacturer of the monitoring system 600.

Figure 7:
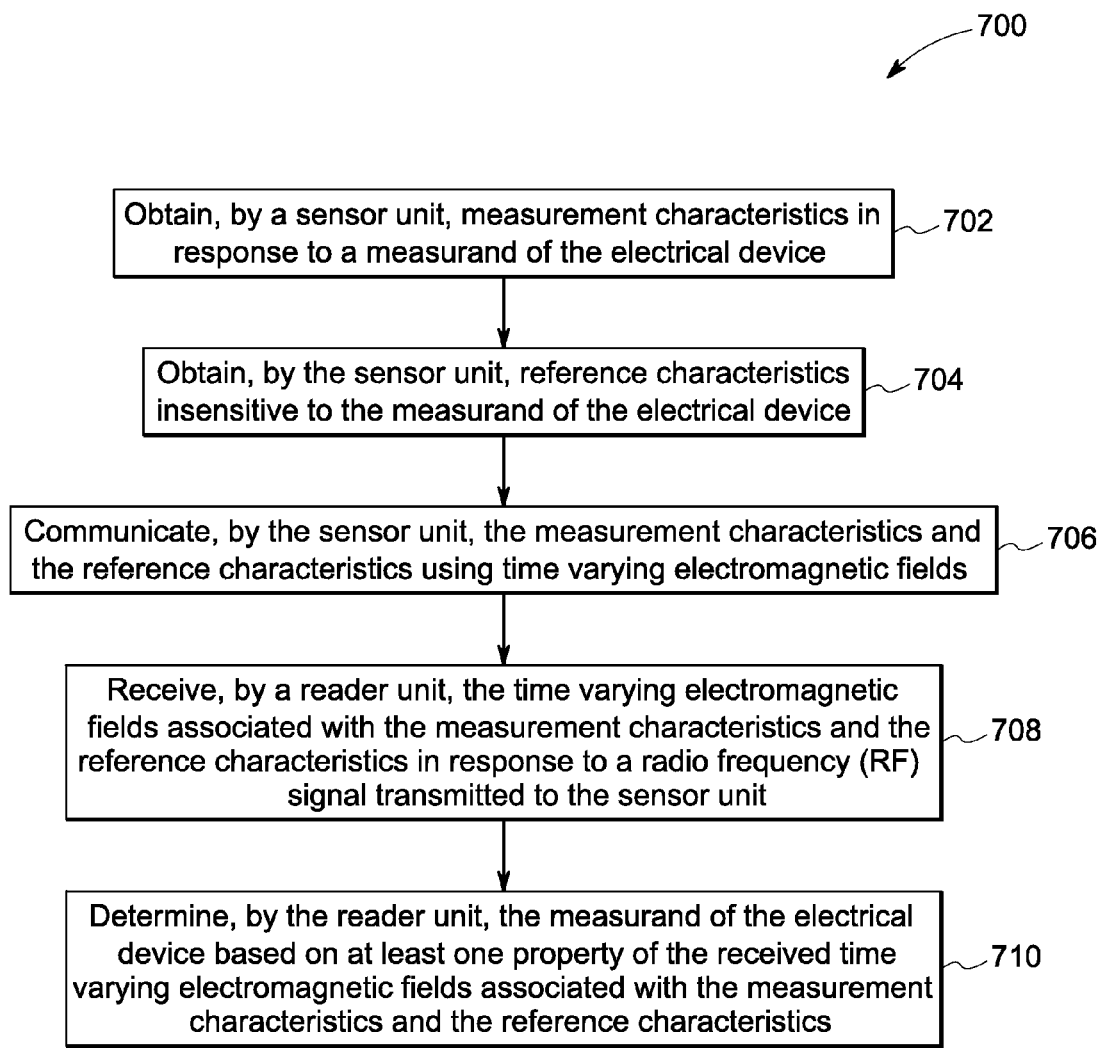
FIG. 7 is a flow chart illustrating a method for monitoring the electrical device, in accordance with aspects of the present disclosure.

Referring to FIG. 7, a flow chart illustrating a method for monitoring an electrical device, in accordance with aspects of the present disclosure, is depicted. For ease of understanding of the present disclosure, the method is described with reference to the components of FIGS. 1-6. The method begins at step 702, where measurement characteristics are obtained in response to one or more measurands of the electrical device 100. The measurands may include temperature in the electrical device, thermal joints, joint condition, hot spot detection, electrical device condition, bad joints and connections, joint oxidation and distortion, increased joint resistance, junction impedance, resistance and reactance, $I^2t$ problems, loose lugs, loose joints, bad bearings, circulating currents, worn circuit breaker contacts, or combinations thereof. To that end, a sensor unit 106 is configured to obtain the measurement characteristics in response to the measurands of the electrical device 100. Particularly, one or more parameters of a sensor tag 108 in the sensor unit 106 may change corresponding to the measurands of the electrical device 100. This change in the one or more parameters of the sensor tag 108 may represent the measurement characteristics.

Subsequently, at step 704, reference characteristics that are insensitive to the measurands of the electrical device 100 are obtained by the sensor unit 106. Particularly, the sensor unit 106 includes one or more reference tags that are configured to obtain the reference characteristics in the electrical device 100. The reference characteristics may represent conditions, such as interferences in the electrical device 100.

In addition, at step 706, the sensor unit 106 may communicate the measurement characteristics and the reference characteristics by using time varying electromagnetic fields. Particularly, the sensor unit 106 receives one or more RF signals from the reader unit 122. Further, the sensor unit 106 may modulate these RF signals corresponding to the measurement characteristics and/or the reference characteristics. Thereafter, the modulated RF signals are sent to the reader unit 122 through time varying electromagnetic fields.

Furthermore, at step 708, the time varying electromagnetic fields associated with the measurement characteristics and the reference characteristics are received by the reader unit 122 in response to the RF signal transmitted to the sensor unit 106. In one embodiment, the reader unit 122 may send a pre-authorization signal along with the RF signal to the sensor unit 106. The sensor unit 106 may verify the pre-authorization signal prior to sending the measurement characteristics and the reference characteristics to the reader unit 122.

Moreover, at step 710, the measurands of the electrical device 100 is determined based on one or more properties of the received time varying electromagnetic fields that are associated with the measurement characteristics and the reference characteristics. In one example, the one or more properties include return signal strength, resonant frequency, resonant frequency shift, polarization, reflection coefficient, backscatter ratio, radar cross section, absorption, and combinations thereof, of the received RF signals from the sensor unit 106. In another example, the one or more properties include delay, phase shift, timing, time characteristics, and combinations thereof, of the received RF signal from the sensor unit 106.

The various embodiments of the system and method aid in monitoring the characteristics or measurands of the electrical device even in the presence of one or more metallic interferers in the electrical device. Also, a far-field communication may be used to determine the measurands of the electrical device, which in turn aids in remotely monitoring the performance or operation of the electrical device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A remote monitoring system for an electrical device, comprising:
 a sensor unit disposed in the electrical device, and configured to
  obtain measurement characteristics in response to a measurand of the electrical device,
  obtain reference characteristics insensitive to the measurand of the electrical device, and
  communicate the measurement characteristics and the reference characteristics using time varying electromagnetic fields; and
 a reader unit to establish a far-field communication with the sensor unit in the presence of at least one metallic interferer in the electrical device, wherein the reader unit is configured to
  receive the time varying electromagnetic fields associated with the measurement characteristics and the reference characteristics in response to at least one radio frequency signal transmitted to the sensor unit, and
  determine the measurand of the electrical device based on at least one property of the received time varying electromagnetic fields associated with the measurement characteristics and the reference characteristics.

2. The remote monitoring system of claim 1, wherein the sensor unit comprises at least one sensor tag disposed at a sensing position on a metallic platform of the electrical device.

3. The remote monitoring system of claim 2, wherein the at least one sensor tag is configured to obtain the measurement characteristics in the presence of the at least one metallic interferer in the electrical device.

4. The remote monitoring system of claim 2, wherein the measurement characteristics comprise a change in at least one parameter of the sensor tag in response to the measurand of the electrical device.

5. The remote monitoring system of claim 4, wherein the parameter of the sensor tag comprises at least one of impedance, dielectric constant, resistance, capacitance, inductance, geometrical parameters, and combinations thereof.

6. The remote monitoring system of claim 2, wherein the at least one sensor tag is disposed at a distance ranging from about 10 cm to about 125 cm from the reader unit.

7. The remote monitoring system of claim 2, wherein the sensor unit comprises at least one reference tag disposed at a reference position in the electrical device, wherein the reference position is at a pre-determined distance from the sensing position in the electrical device.

8. The remote monitoring system of claim 7, wherein the reference characteristics comprise at least one parameter of the at least one reference tag, wherein the at least one parameter comprises impedance, impedance change, a geometrical parameter, a coupling parameter, a dielectric constant, gain, resonant frequency, resonant frequency shift, and combinations thereof.

9. The remote monitoring system of claim 1, wherein the sensor unit communicates the measurement characteristics using the time varying electromagnetic fields when the at least one RF signal comprising a first RF signal is received from the reader unit.

10. The remote monitoring system of claim 9, wherein the sensor unit communicates the reference characteristics using the time varying electromagnetic fields when the at least one RF signal comprising a second RF signal is received from the reader unit.

11. The remote monitoring system of claim 1, wherein the property of the received time varying electromagnetic fields comprises at least one of return signal strength, resonant frequency, resonant frequency shift, polarization, reflection coefficient, backscatter ratio, radar cross section, absorption, and combinations thereof.

12. The remote monitoring system of claim 1, wherein the at least one property of the received time varying electromagnetic fields comprises at least one of delay, phase shift, timing, time characteristics, and combinations thereof.

* * * * *